(12) United States Patent
Luukkainen et al.

(10) Patent No.: US 9,991,646 B2
(45) Date of Patent: Jun. 5, 2018

(54) COMBINED CHARGER CONNECTOR, CHARGER CABLE DECORATION, AND SPURIOUS EMISSION COMMON-MODE FILTERING COIL

(71) Applicant: Nokia Corporation, Espoo (FI)

(72) Inventors: Marko Luukkainen, Tampere (FI); Tero Knuuttila, Tampere (FI); Esa Saunamäki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 675 days.

(21) Appl. No.: 14/285,491

(22) Filed: May 22, 2014

(65) Prior Publication Data

US 2015/0340902 A1 Nov. 26, 2015

(51) Int. Cl.
*H02J 7/02* (2016.01)
*H01R 13/66* (2006.01)
*H01F 17/02* (2006.01)
*H01R 13/719* (2011.01)
*H02J 7/00* (2006.01)

(52) U.S. Cl.
CPC ......... *H01R 13/6633* (2013.01); *H01F 17/02* (2013.01); *H02J 7/02* (2013.01); *H01R 13/719* (2013.01); *H02J 2007/0062* (2013.01)

(58) Field of Classification Search
USPC ....................................................... 307/104
See application file for complete search history.

(56) References Cited

U.S. PATENT DOCUMENTS

| | | | |
|---|---|---|---|
| 5,656,872 A | 8/1997 | Lee | |
| 6,029,072 A * | 2/2000 | Barber | G01C 21/26 455/556.1 |
| 8,600,451 B2 | 12/2013 | Zhu et al. | |
| 8,655,272 B2 | 2/2014 | Saunamaki | |
| 2007/0250139 A1 * | 10/2007 | Kanzius | A61N 1/406 607/100 |
| 2013/0187474 A1 | 7/2013 | De Boodt | |
| 2014/0013361 A1 * | 1/2014 | Monari | H04N 5/2252 725/62 |
| 2014/0203767 A1 * | 7/2014 | Wang | H02J 5/005 320/108 |

OTHER PUBLICATIONS

"Clamp Filters (Ferrite Core with Case)." TDK. TDK, Jul. 2013. Web. Jan. 20, 2017. <https://product.tdk.com/info/en/catalog/datasheets/e9a15_zcat.pdf>.

(Continued)

*Primary Examiner* — Hal Kaplan
*Assistant Examiner* — Xuan Ly
(74) *Attorney, Agent, or Firm* — Mintz Levin Cohn Ferris Glovsky and Popeo, P.C.

(57) ABSTRACT

Methods and apparatus, including computer program products, are provided for a filtering coil. In some example embodiments, there may be provided an apparatus. The apparatus may include a connector mated to enable coupling to a user equipment; and an air-core inductive coil coupled to the connector, wherein the air-core inductive coil includes at least one coil configured to attenuate a radio frequency signal emanating from the user equipment and pass at least direct current power signal to the connector.

25 Claims, 21 Drawing Sheets

(56) References Cited

OTHER PUBLICATIONS

"Laird Technologies 28A5131-0A2." Laird Technologies—28A5131-0A2—Broadband 425 Ohms @100MHz Max ID 1.00 in EMI Ferrite Split/Snap-On Core—Allied Electronics. N.p., n.d. Web. Apr. 14, 2014. <http://www.alliedelec.com/laird-technologies-28a5131-0a2/70065359/>.

"*Noise Suppression by EMIFIL® Application Guide.*" Murata. Murata, Sep. 5, 2013. Web. Jan. 20, 2017. <http://www.murata.com/~/media/webrenewal/support/library/catalog/products/emc/emifil/c35e.ashx?la=en-us>.

"Save on Induction Innovations—MD99-601 at ToolTopia.com." ToolTopia.com. N.p., n.d. Web. Apr. 14, 2014. <http://www.tooltopia.com/induction-innovations-md99-601.aspx>.

* cited by examiner

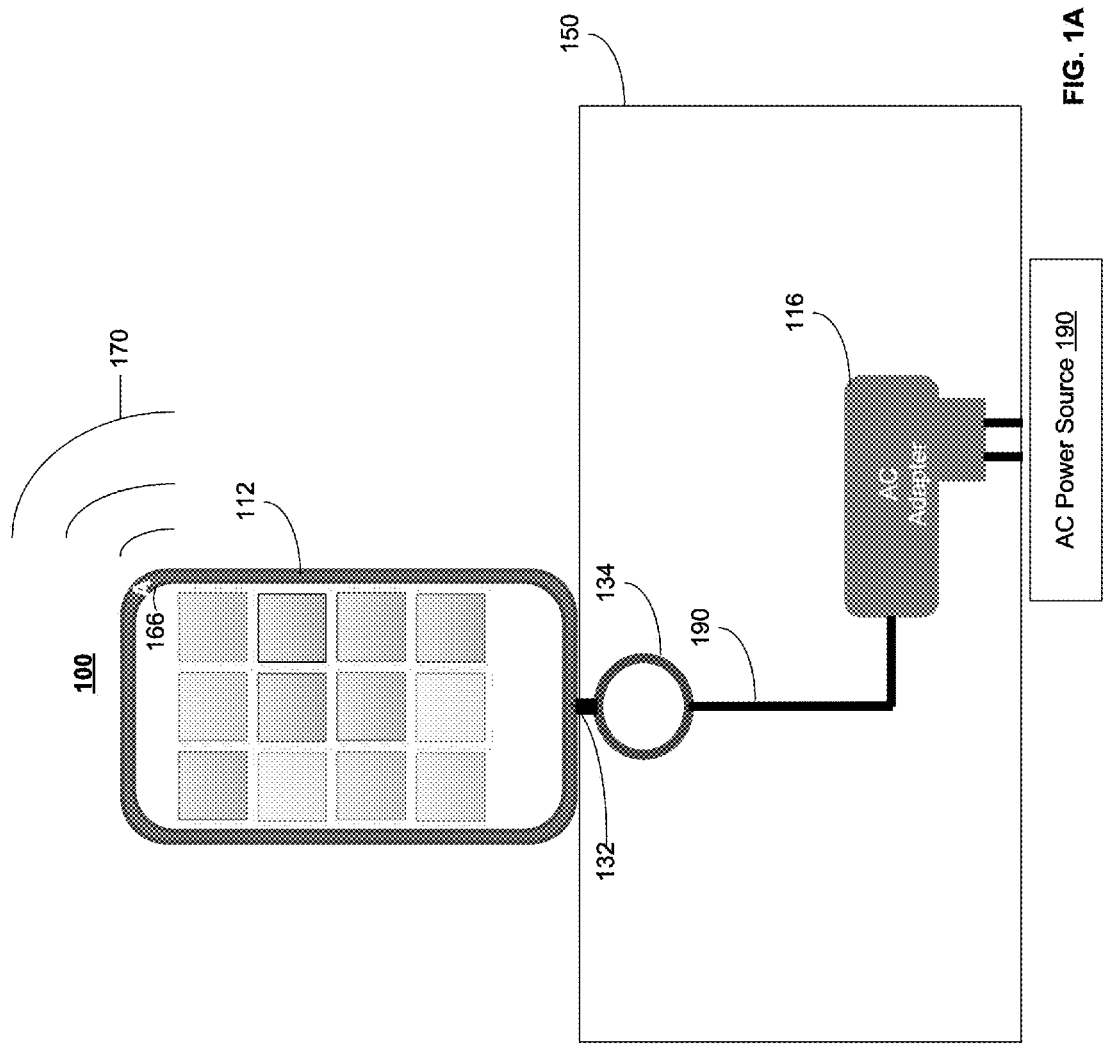

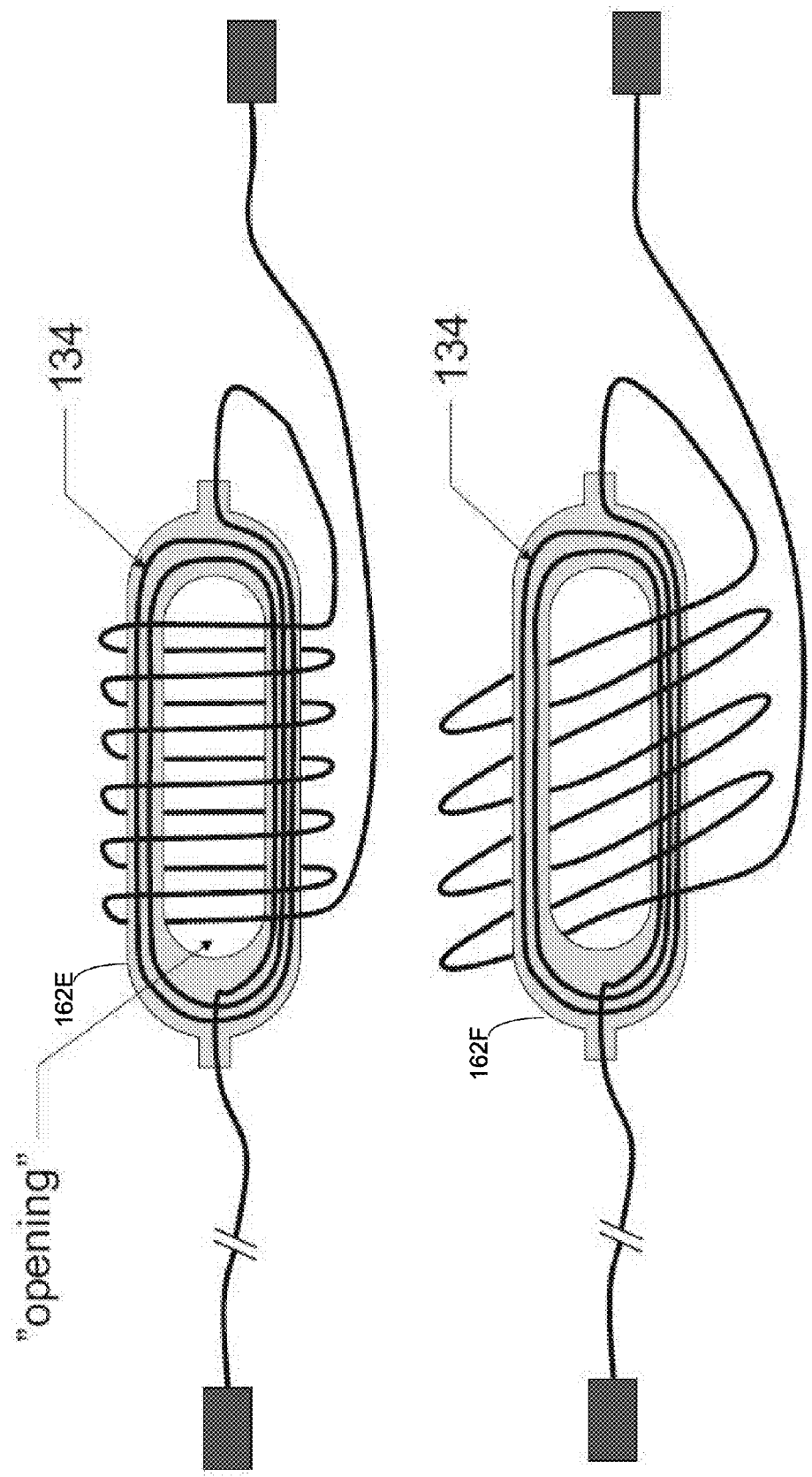

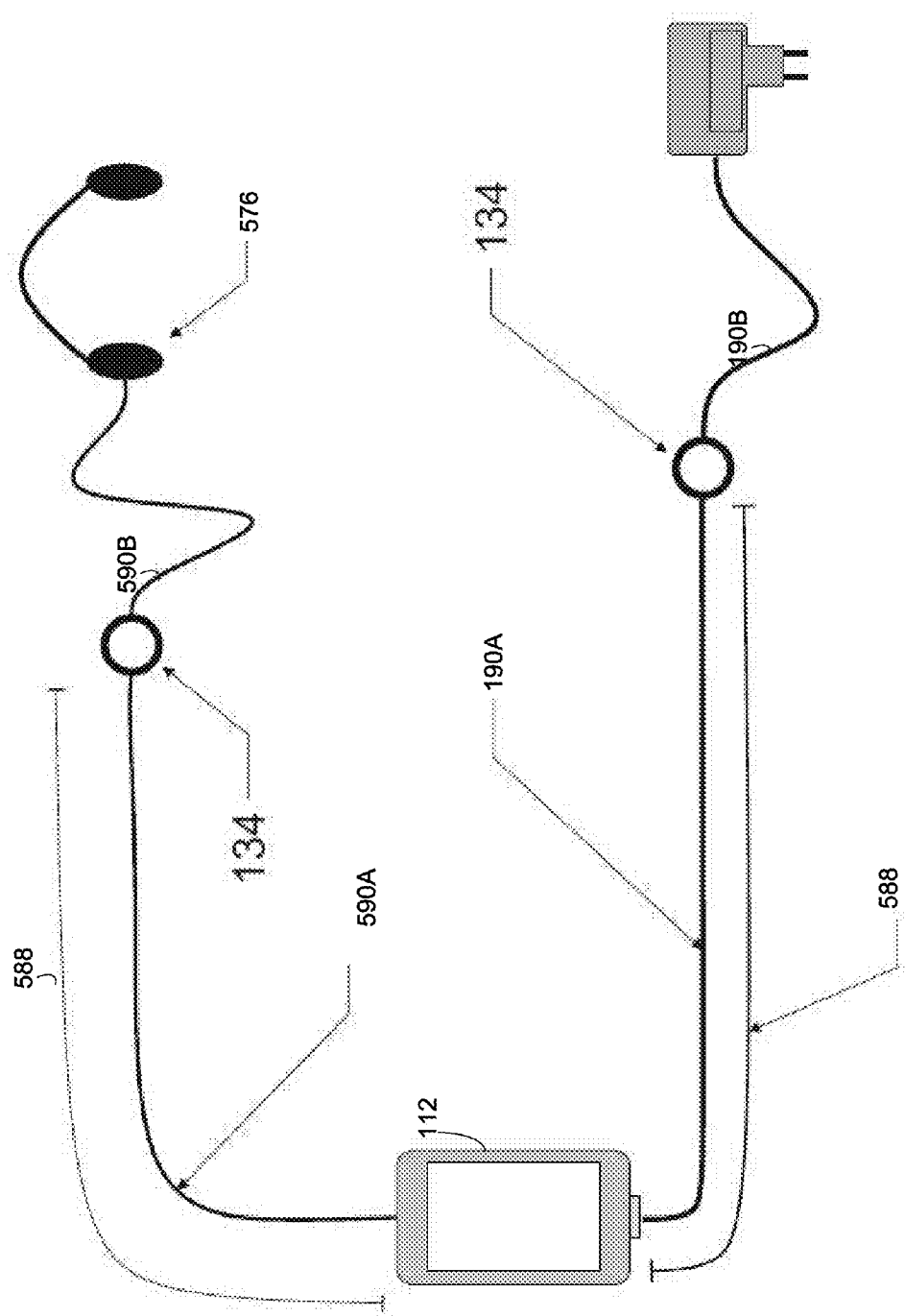

COMBINED CHARGER CONNECTOR, CHARGER CABLE DECORATION, AND SPURIOUS EMISSION COMMON-MODE FILTERING COIL

FIELD

The subject matter described herein relates to wireless devices and/or accessories for wireless devices.

BACKGROUND

Wireless devices by their very nature radiate electromagnetic energy. For example, a cell phone may transmit a signal via an antenna to another transceiver. Moreover, this transmission may be regulated by governmental regulatory agencies. Indeed, this interference may have an effect on other devices and cause interference that degrades the performance of the other devices.

SUMMARY

Methods and apparatus, including computer program products, are provided for a filtering coil.

In some example embodiments, there may be provided an apparatus. The apparatus may include a connector mated to enable coupling to a user equipment; and an air-core inductive coil coupled to the connector, wherein the air-core inductive coil includes at least one coil configured to attenuate a radio frequency signal emanating from the user equipment and pass at least direct current power signal to the connector.

In some variations, one or more of the features disclosed herein including the following features can optionally be included in any feasible combination. The air-core inductive coil may further comprise a structure carrying the at least one coil. The structure may be detachably coupled to at least one cable, wherein the cable is coupled to the connector and the air-core inductive coil including the at least one coil. The structure may include a hollow, center region. The coil may be placed in a location relative to the user equipment to provide an antenna portion to the user equipment. The placed coil may provide a tunable antenna including the antenna portion. The radio frequency signal emanating from the user equipment may include at least a first signal representative of a signal transmitted by the user equipment and a second signal representative of a higher harmonic of the first signal. An alternating current to direct current converter may be coupled to the air-core inductive coil and the connector, wherein the alternating current to direct current converter provides at least the direct current power signal to the connector. The air-core inductive coil may be located between the connector and the alternating current to direct current converter. The alternating current to direct current converter may contain the air-core inductive coil. The connector may contain the air-core inductive coil. The connector may include at least one of a universal serial bus connector or a micro universal serial bus connector.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 1A depicts an example of a charger including an inductor, in accordance with some exemplary embodiments;

FIGS. 4A-4G depict example implementations of the coil including a structuring carry the coil, in accordance with some exemplary embodiments;

FIGS. 5E-I depict example implementations in which the location or placement of the coil may be tunable, in accordance with some exemplary embodiments;

Figure 1B:
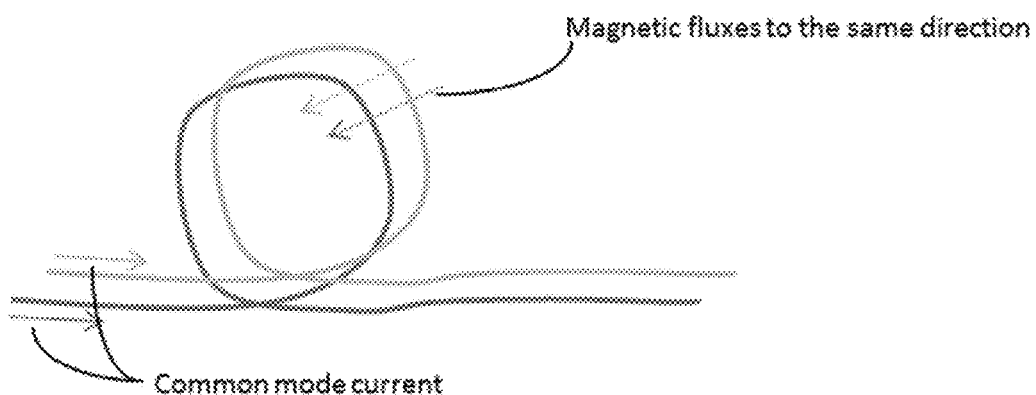
FIG. 1B depicts examples of an air-core inductor coil, in accordance with some example embodiments.

Like labels are used to refer to same or similar items in the drawings.

DETAILED DESCRIPTION

User equipment, such as smart phones and the like, may include an antenna to transmit signals to an intended receiver and/or receive signals from an intended source. However, the user equipment may emit signals that are not intended to be transmitted. Specifically, the user equipment may transmit interference in the form of harmonics of the transmitted signal. To illustrate, if the antenna transmits a signal at a first frequency, undesired and/or unintended higher-order harmonics may be transmitted by the user equipment via for example a coupled device, such as a charger, a headset, and/or any other coupled accessory. When this is the case, the coupled charger may radiate or transmit undesired and/or unintended signals, including a signal representative of the transmitted signal and/or higher-order harmonics of the signal. These harmonics may be undesirable because they represent interference to other devices and may violate the frequency regulatory controls placed on the user equipment.

The subject matter disclosed herein may provide a charger that includes a coil, such as an inductive coil, an air coil inductor, and/or any other type of inductor, to attenuate interference from the user equipment. For example, the inductive coil may attenuate (or filter) electromagnetic energy produced by the user equipment and conducted/radiated via a cable to an accessory (and/or vice versa). This attenuated electromagnetic energy may include first-order energy, such as the signal being transmitted by the user equipment, higher-order harmonics, and/or any other undesired electromagnetic emission.

In some example embodiments, the charger may include an inductive coil (for example, an air-core inductor) in the connector coupling to the user equipment, in the cable(s) coupling the connector to the alternating current (AC) adapter, and/or in the alternating current adapter itself.

Figure 1B:
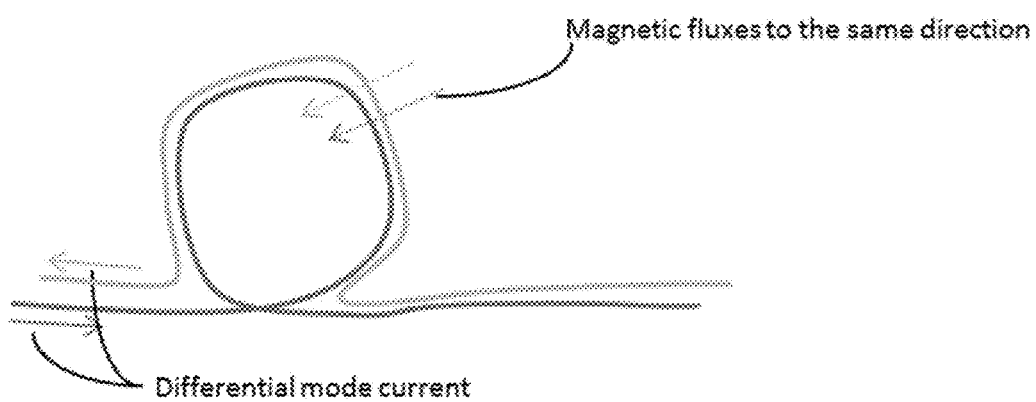

FIG. 1 depicts an example of a user equipment 112 coupled to a charger device 150, in accordance with some example embodiments. The charger 150 may include a connector 132, such as a universal serial bus connector and/or any other type of connector, and connector 132 may couple into a corresponding connector at user equipment 112.

The charger 150 may, in accordance with some example embodiments, also include a coil, such as an inductive coil 134. The inductive coil 134 may also be coupled to one or more cables 190 carrying among other things power and/or control signals to AC adapter 116. AC adapter 116 may convert AC power into a direct current (DC) to charge or power user equipment 112. AC adapter 116 may also include control circuitry to control charging of user equipment 112 and the like.

The inductive coil 134 may be implemented as an air-core inductor, in accordance with some example embodiments. For example, inductive coil 134 may be implemented using one or more turns, two or more turns (or coils) of wire, three or more turns of wire, four or more turns of wire, and/or five or more turns of wire, as depicted at FIG. 1B. An inductor coil formed from 2 or more turns may be sufficient to attenuate the transmit signals (including harmonics) which couple from one or more antennas 166 of the user equipment 112 to the charger 150, although the indictor coil may also attenuate any unwanted interference from the charger 150 to the user equipment 112 as well. For example, in some example embodiments, the inductor coil 134 may configured using an inner diameter coil of about 1 to 2 centimeters using 5 windings of the coil, although other windings and diameters may be used dependent on the frequency being attenuated. The coils may be configured as a common mode coil or a differential mode coil. FIG. 1B depicts an example of a common mode air inductor coil (top of drawing) and a differential mode coil (bottom of drawing), in accordance with some example embodiments. The inductance of the coil 134 may, in some example embodiments, be varied by changing the radius of the coil, the number of turns (or coils), and/or the length of the coil. Although some of the examples refer to an air coupled coil, other types of inductors may be used as well, and some of the coils may include a material having for example a high permeability, loss angle, dielectric loss angle, permittivity, nano-materials, and the like.

In some example embodiments using the air-core inductor, the coils of inductor 134 may be implemented in the connector 132 itself, as part of the cable decoration 190, and/or in the AC adapter 116.

The inductive coil 134 may be configured to allow DC or low frequency signals to pass through but attenuate or cut-off certain frequencies, such as the transmits signal 170 emanated by an antenna at user equipment 112 and/or higher-order (for example, frequency) harmonics of transmit signals 170.

To illustrate, when user equipment 112 is in use, user equipment 112 may transmit via an antenna one or more signals 170 carried at a first frequency to an intended receiver, such as another radio. However, undesired and/or unintended frequencies, such as the transmit frequency and/or higher-order harmonics, may be carried via connector 132 to charger 150. Inductive coil 134 may attenuate or filter these undesired and/or unintended frequencies and thus prevent them from being emanated by charger 150 including AC adapter 116.

Figure 2:
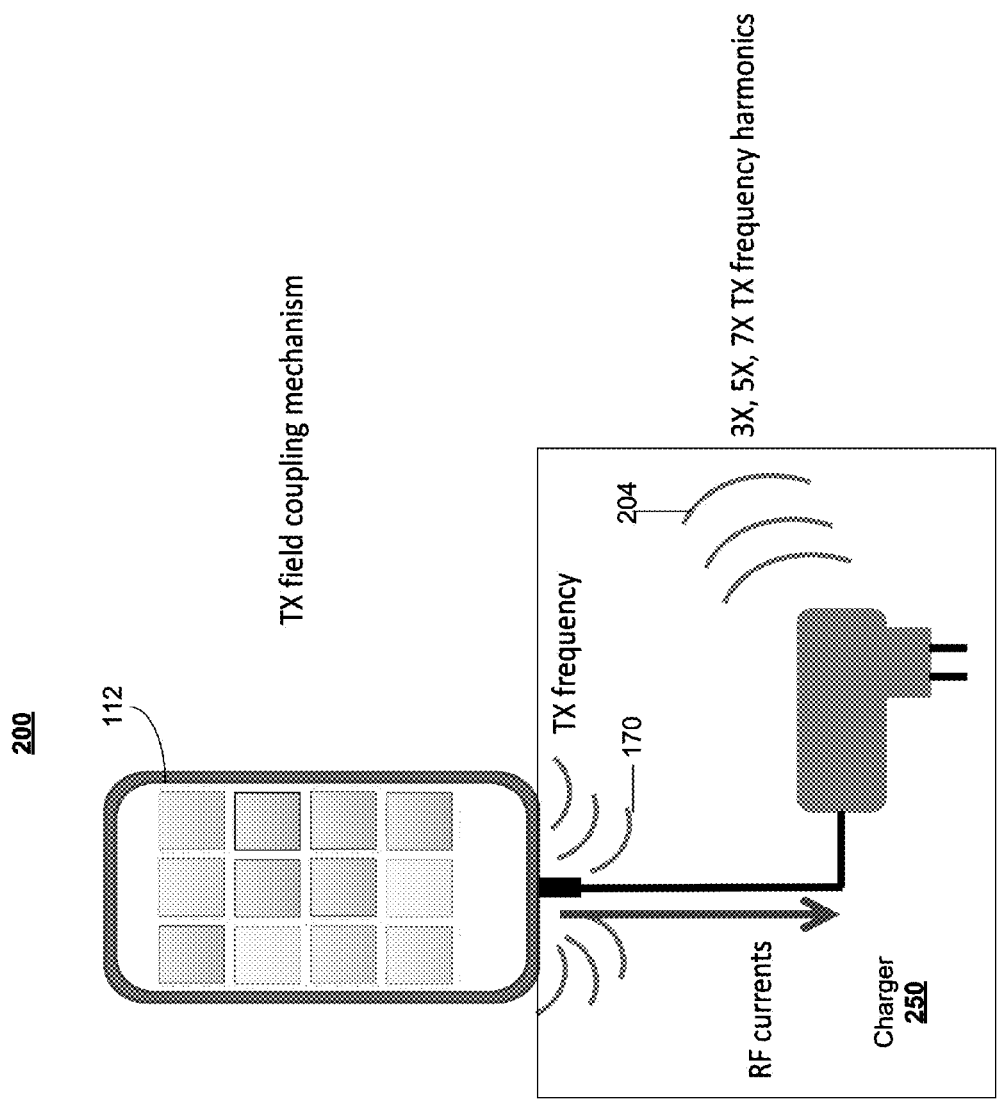
FIG. 2 depicts an example of a charger not having an inductor as disclosed herein with some exemplary embodiments.

FIG. 2 depicts user equipment 112 coupled to a charger 250 that does not include a coil, in accordance with some of the embodiments disclosed herein. Because there is no coil, energy related to the first frequency signal 170 (including higher-order harmonics) may radiate through charger 250 at 204.

Figure 3:
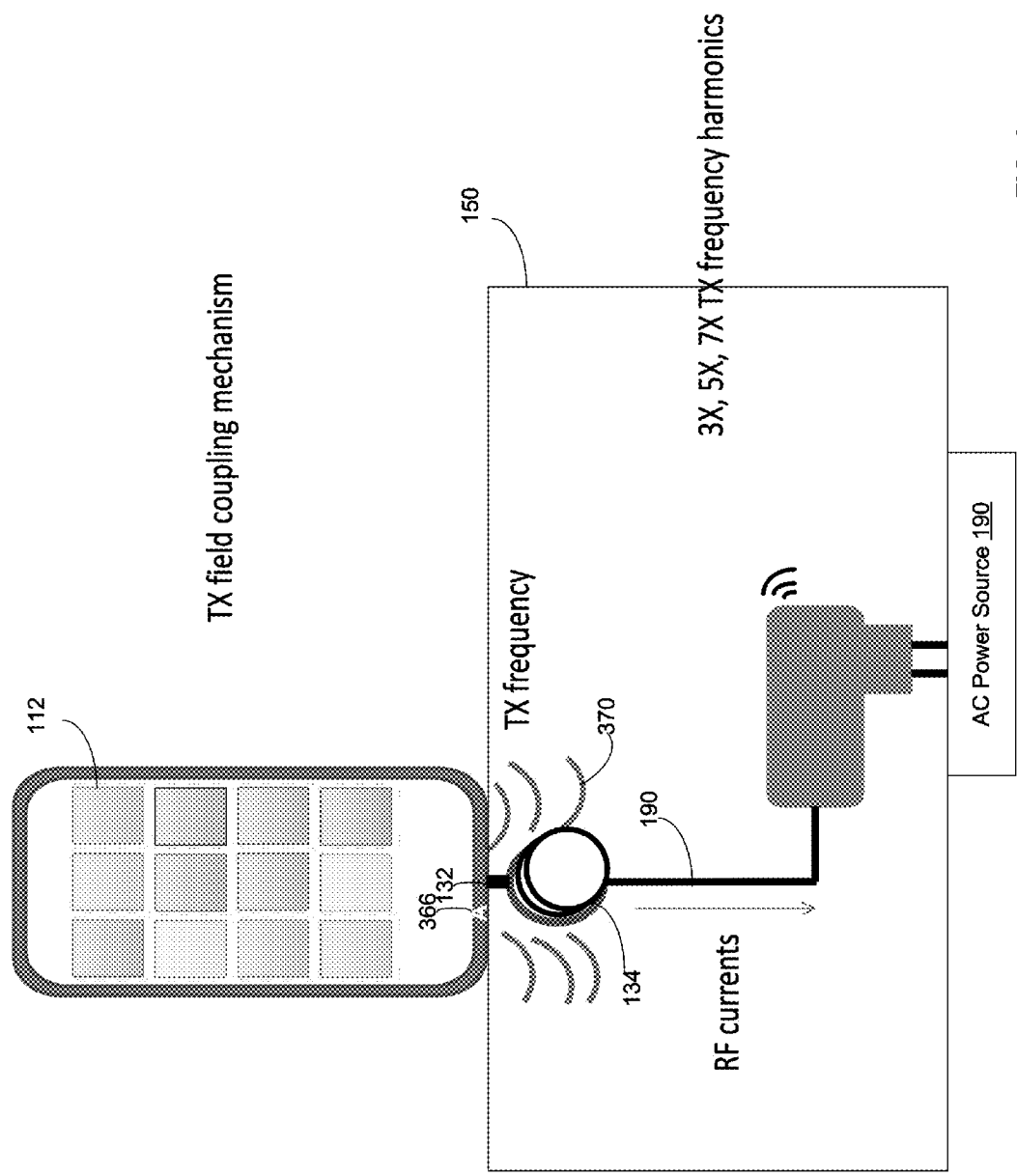
FIG. 3 depicts another example of a charger including an inductor, in accordance with some exemplary embodiments.

FIG. 3 is similar to FIG. 1 in some respects but shows at least one antenna 366 transmitting signal 370 in a location that is closer to charger 150. To illustrate with an example, suppose the transmit signal 370 frequency is at 700 Megahertz (MHz). If this is the case, inductor coil 134 may be implemented using for example two or more turns (although other coil configurations may be used as well) to filter out/attenuate at least 700 MHz, as well as one or more higher-order harmonics including 1400 MHz, 2100 MHz, and so forth. Absent inductive coil 134, unintended transmissions may emanate from the user equipment 112 to charger 150.

Figure 4A:
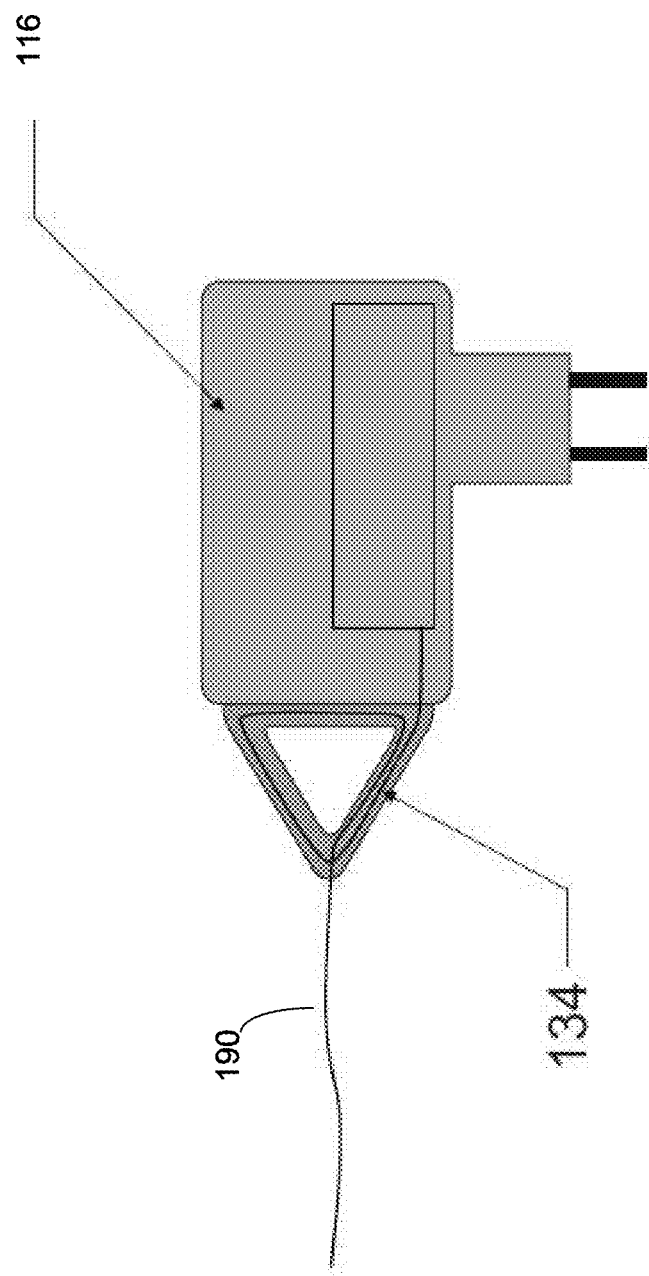

FIG. 4A depicts an example implementation of coil 134, in accordance with some example embodiments. In the example of FIG. 4A, the coil 134 comprises an air-core coil that is part of the AC adaptor 116, and, in particular, at the input of the AC adaptor 116. The air-core coil may be wound around a triangular structure as shown.

Figure 4B:
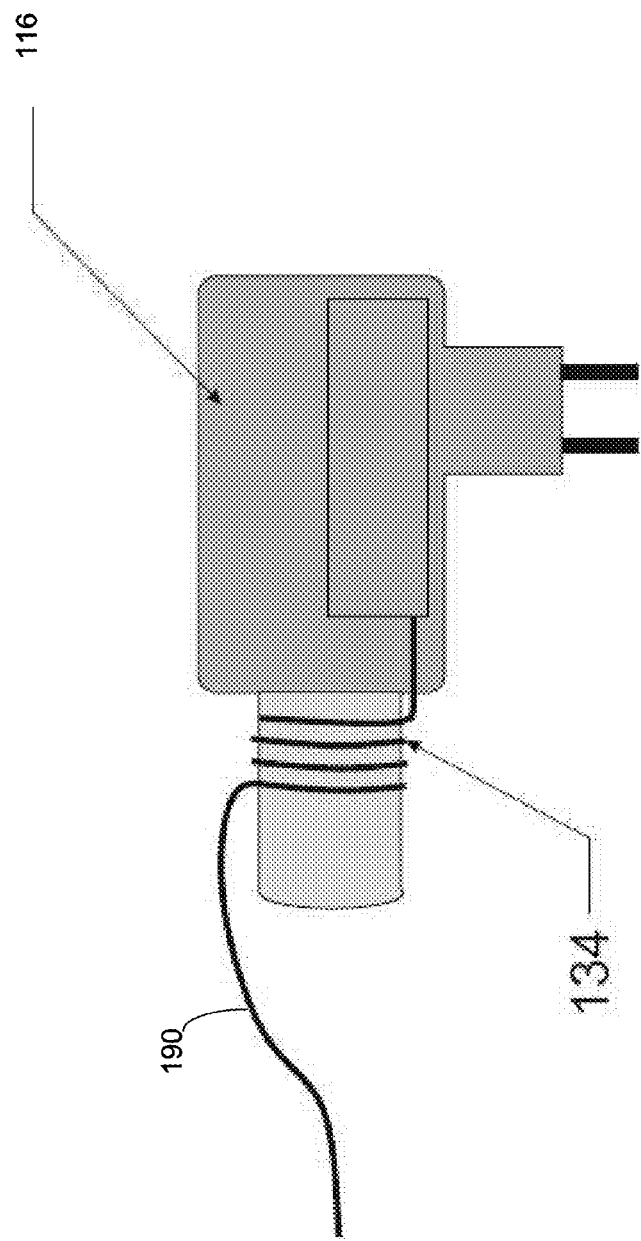

FIG. 4B depicts another example implementation of coil 134, in accordance with some example embodiments. In the example of FIG. 4B, the coil 134 comprises an air-core coil wound around a material that extends from the AC adaptor 116. The air-core coil may be wound around a cylindrical structure (which may be solid or hollow) as shown.

Figure 4C:
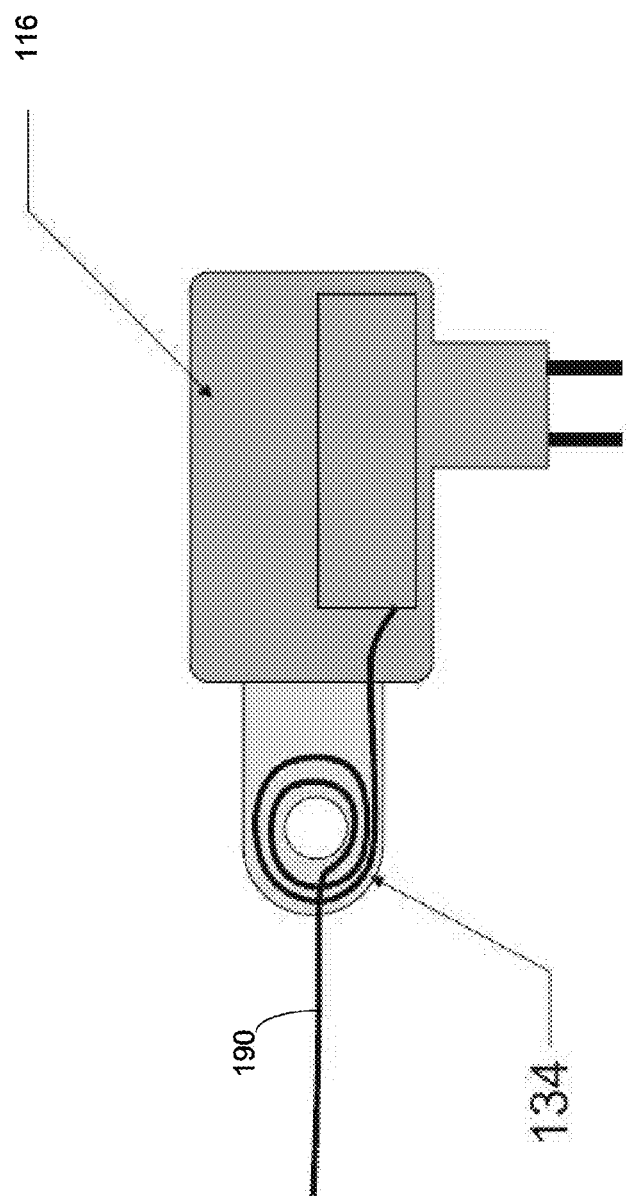

FIG. 4C depicts another example implementation of coil 134, in accordance with some example embodiments. In the example of FIG. 4C, the coil 134 comprises an air-core coil wound around a material that extends from the AC adaptor 116. The air-core coil may be wound around a hollow structure as shown.

Figure 4D:
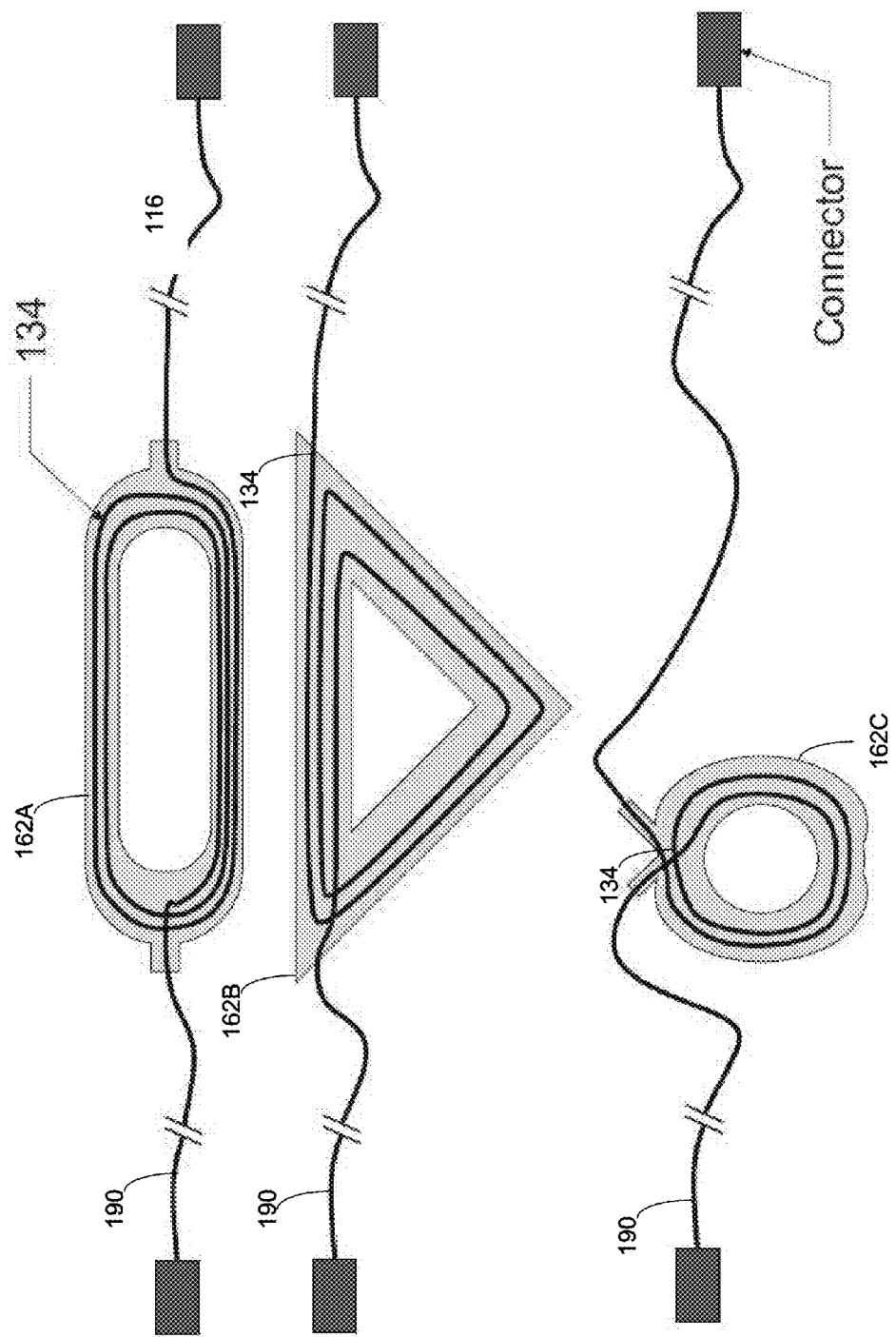

FIG. 4D depicts additional implementation examples of coil 134 formed in cable 190, in accordance with some example embodiments. In the examples of FIG. 4D, the air-core coil 134 is wound inside and around decorative structures 162A-C that can be fixedly coupled or detachably coupled to the cable 190. These structures 162A-C may be fixedly attached to the cable 190 by a user (for example, a snap-on or clip on mechanism to attach to cable 190). In the case of structures 162A-C being detachably coupled to the cable 190, the structures may also have connectors to allow coupling to cable 190, and the structures may allow a user to wrap or unwarp the cable around (or inside) the structure.

In some example embodiments, structure 162A represents a coil formed with at least one turn and placed between the connector 132 and AC adapter 116. This structure corresponds to an oval, racetrack-type shape having a hollow center. The structure 162B represents a coil formed with at least one turn and placed between the connector 132 and AC adapter 116, and the structure corresponds to a triangle or pyramid having a hollow center. The structure 162C provides a base for a coil formed with at least one turn and placed between the connector 132 and AC adapter 116, and the structure corresponds to a complex shape (for example, an apple shape and/or any other decorative shape) having a hollow center.

Figure 4E:
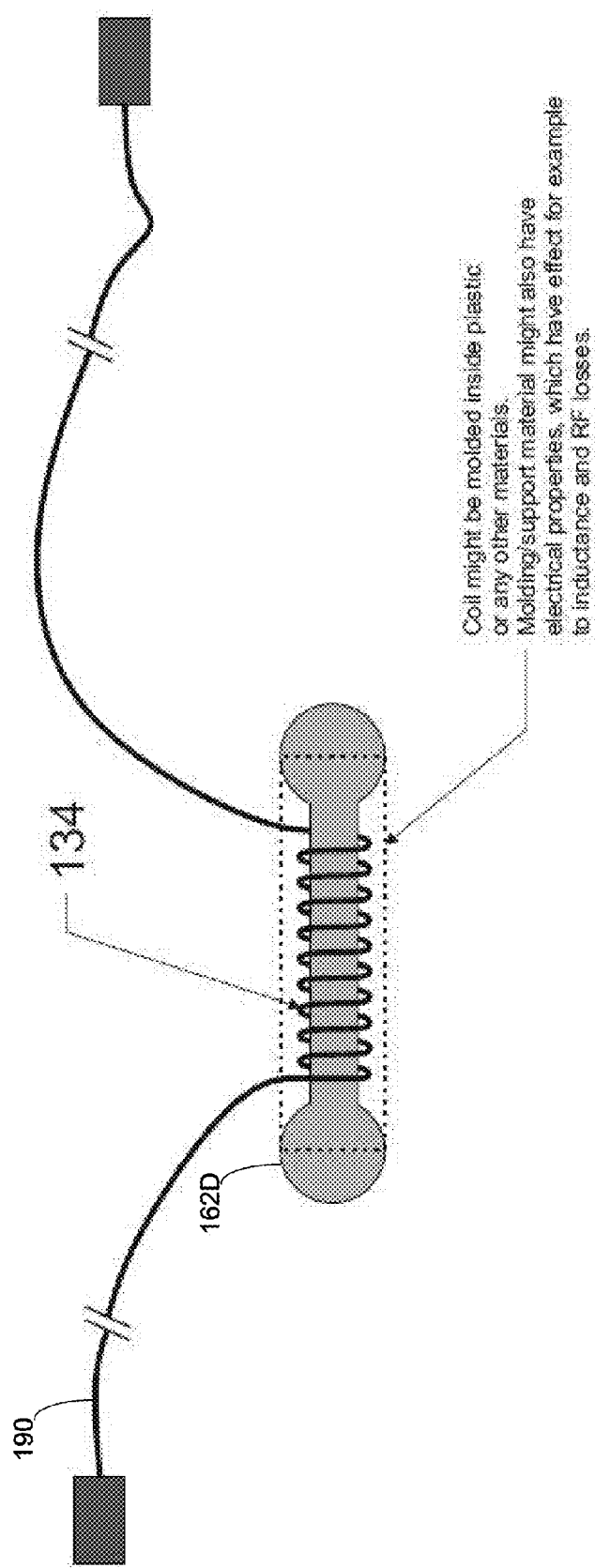

FIG. 4E depicts an additional implementation example of coil 134 formed in cable 190, in accordance with some example embodiments. In the example of FIG. 4E, the coil 134 may be wound around decorative structure 162D, such as a piece of material formed from plastic, although other suitable materials may be used as well. The structure 162C may provide a base for coil 134 formed with at least one turn and placed between the connector 132 and AC adapter 116. Moreover, decorative structure 162D may detachably coupled or fixed to cable 190, but if detachable coupled, structure 162 may include connectors to allow coupling to (and decoupling from) cable 190, or the structure 162D may allow a user to wrap or unwarp the cable around (or inside) the structure.

FIG. 4F depicts additional implementation examples of coil 134 formed in cable 190, in accordance with some example embodiments. The decorative structures 162E and F are similar to structure 162A, but 162E and F show additional windings around the exterior of the structure (as shown in 162E) and around the interior hollow center (as shown in 162F).

Figure 4G:
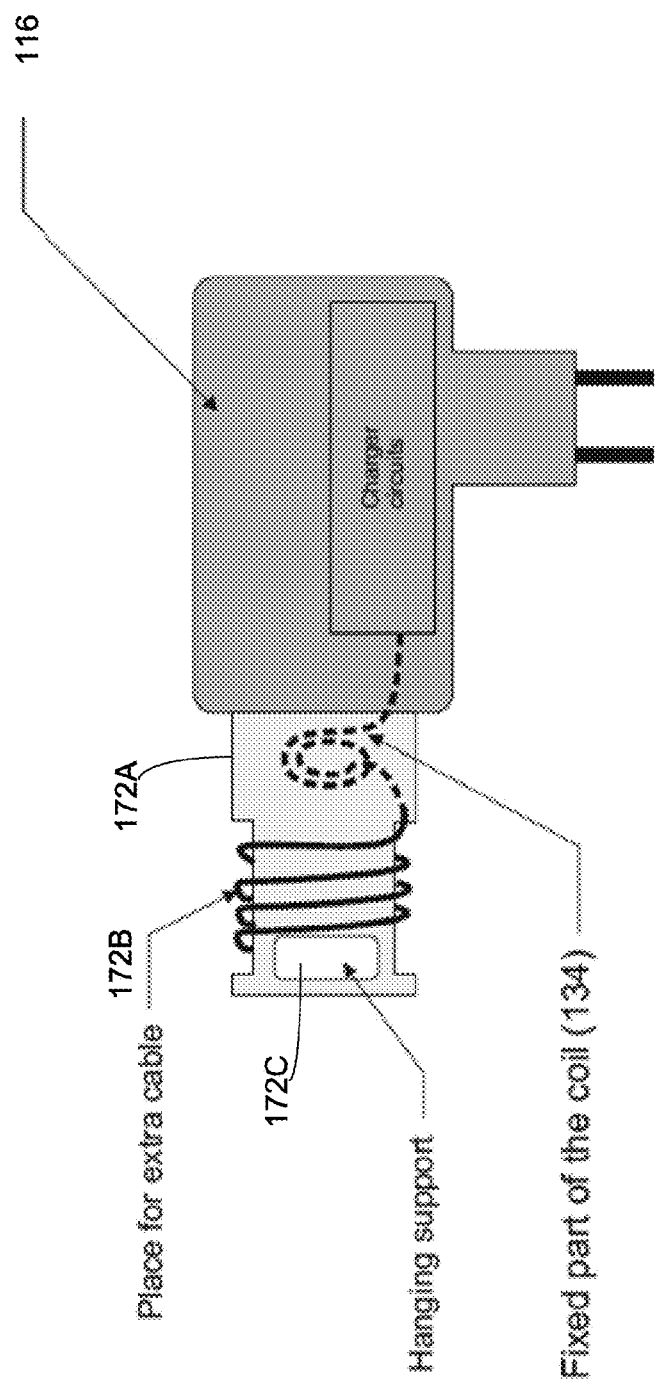

FIG. 4G depicts another example implementation of coil 134, in accordance with some example embodiments. In the example of FIG. 4G, the coil 134 comprises an air-core coil wound around a structure 172A that extends from the AC adaptor 116. The air-core coil may have a fixed part as shown and a variable or tunable part 172B, that can be varied by a user to attenuate interference and/or enhance reception or signal quality. The structure 172A may also include an opening 172C for hanging or storing the device.

Figure 5A:
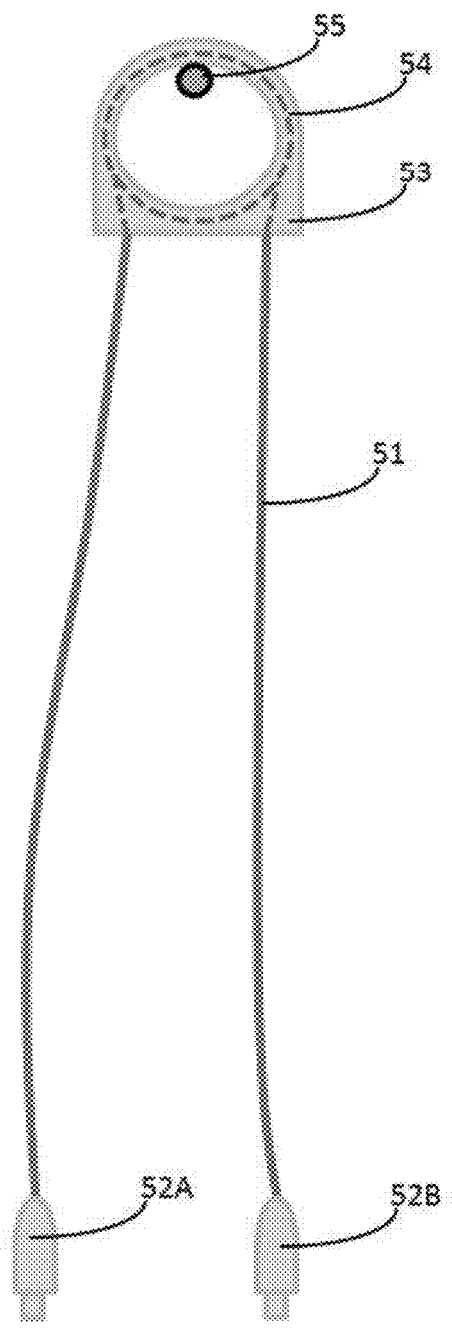
FIGS. 5A-5D depict additional implementations of the structuring carry the coil, in accordance with some exemplary embodiments.
Figure 5B:
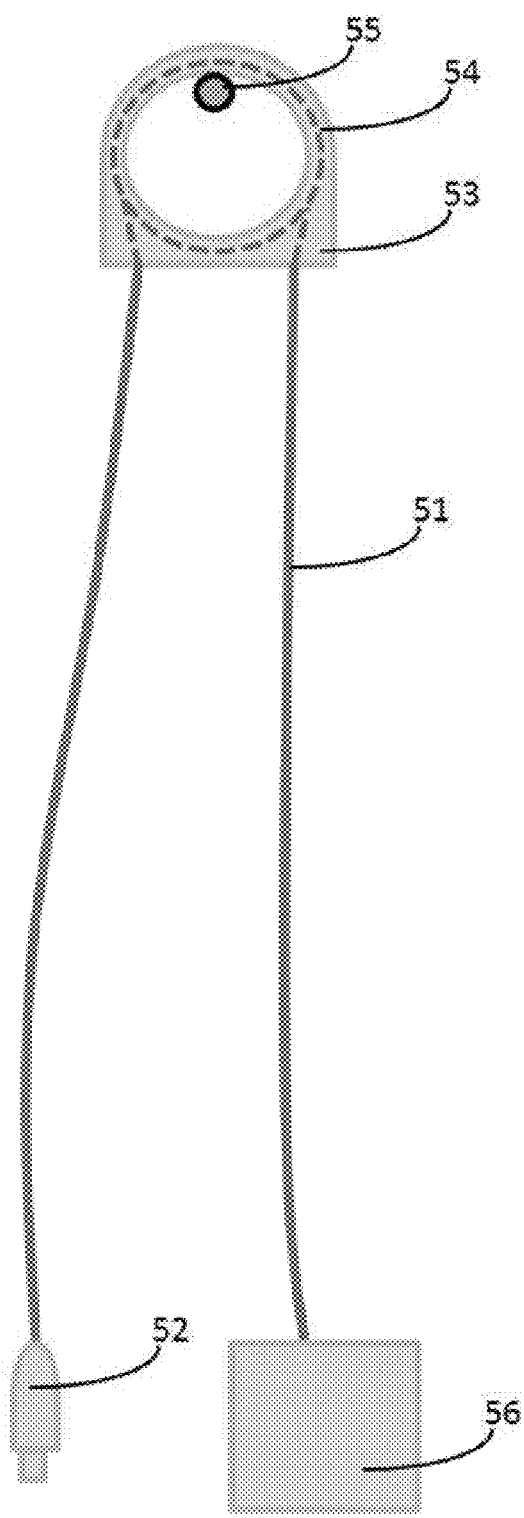

FIG. 5A depicts another example implementation of a coil, in accordance with some example embodiments. The system may include at least one coil 54, cable 51, connectors 52A-B, and a coil base 53. The air-core coil 54 may be shaped and mechanically fitted into coil base 53 to allow it to be hung on a hook 55 or other mechanism. FIG. 5B depicts another example implementation of a coil, in accordance with some example embodiments. The system includes at least one coil 54, cable 51, connectors 52, and an accessory 56 (for example, a charger, headset, and/or any other device), and a coil base 53. The air-core coil 54 may also be shaped to permit hanging via hook 55.

Figure 5C:
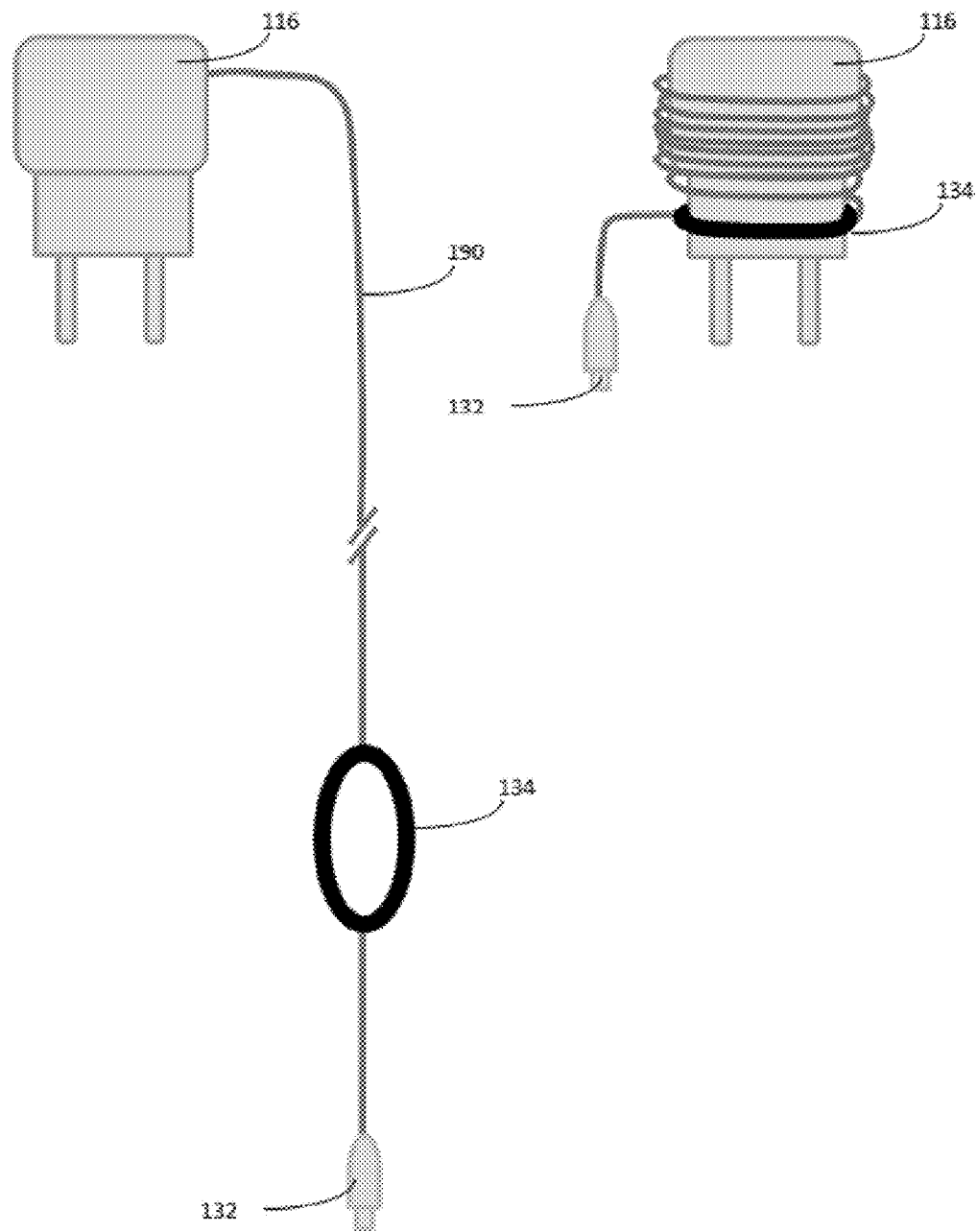

FIG. 5C depicts another example implementation of a coil, in accordance with some example embodiments. In the example of FIG. 5C, the air-core coil 134 may be used to attached and/or affixed to the charger 116. For example, the air-core coil 54 may be made of a flexible elastomeric material and stretched around the charger 116 (or other accessory, such as a headset and the like).

Figure 5D:
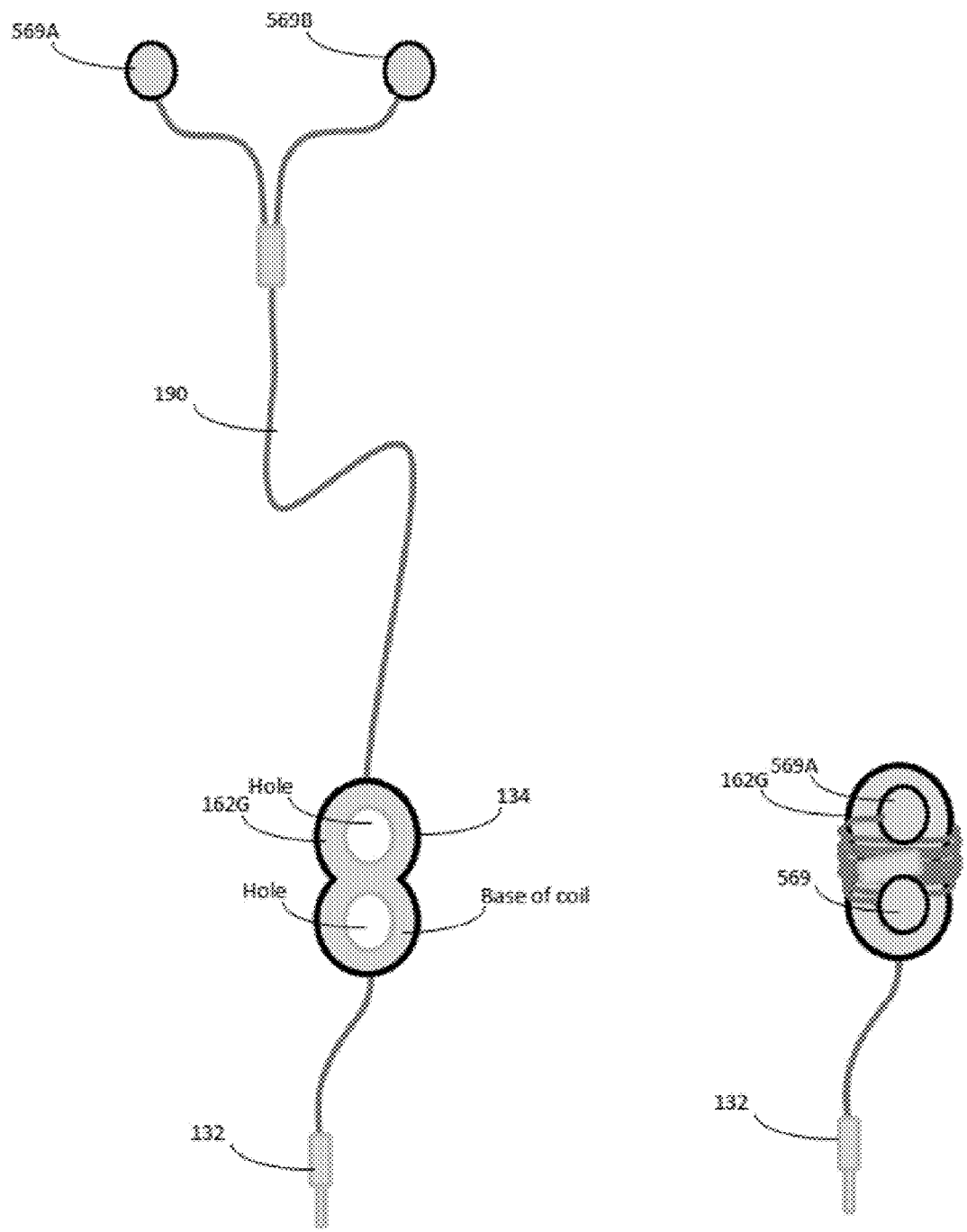

FIG. 5D depicts another example implementation of a coil, in accordance with some example embodiments. In the example of FIG. 5D, the air-core coil 134 is wrapped around a structure 162G. This decorative structure 162G includes two hollow portions into which the headsets 569A-B may be inserted, when not in use. Moreover, structure 162G may carry the one or more turns for the coil as well.

Figure 5E:
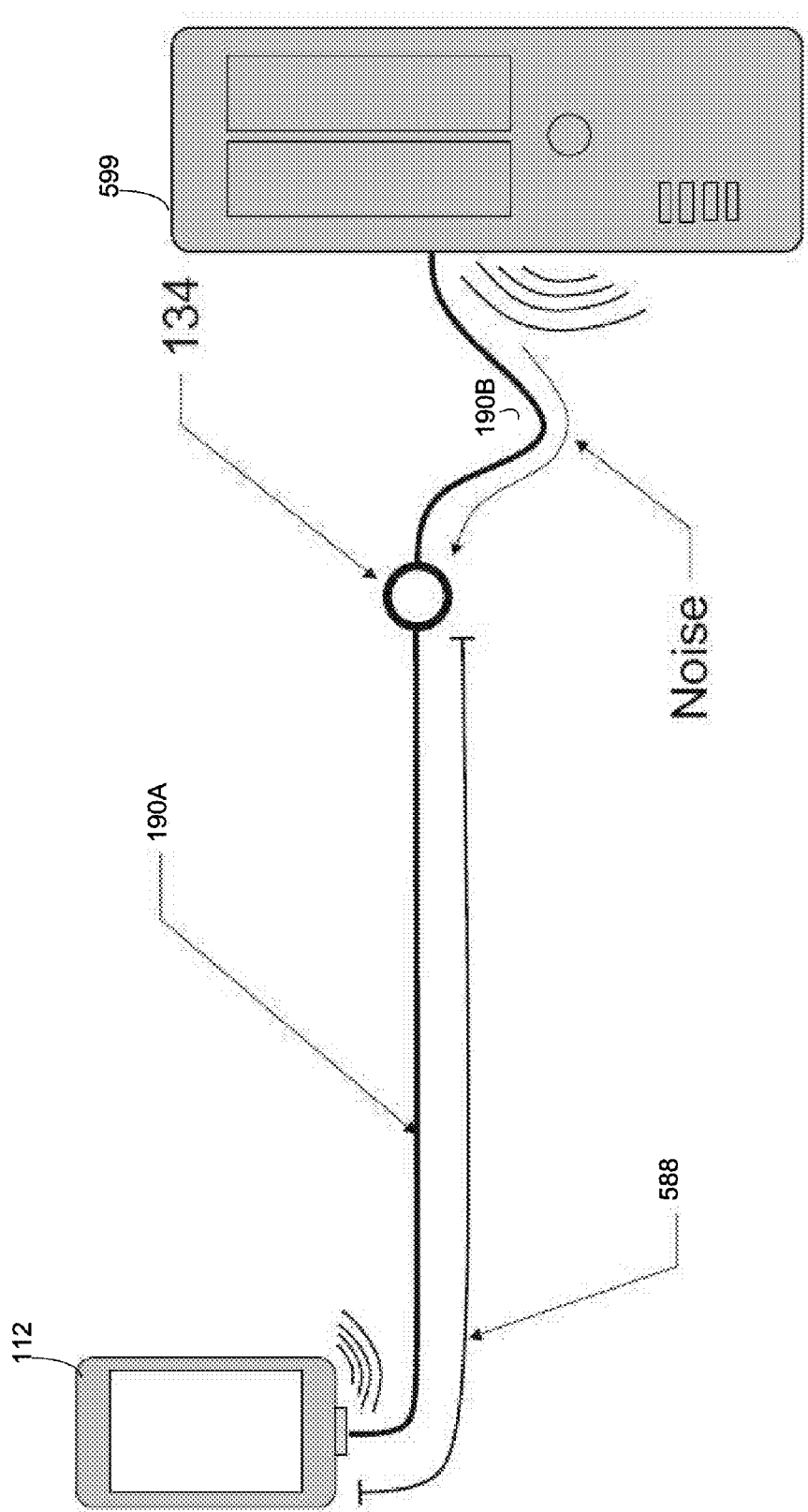

FIG. 5E depicts a system in which air-core coil 134 is tuned by placing it at certain locations along cable 190A-B, in accordance with some example embodiments. For example, the placement of the air-core coil 134 may be used to establish a length 588 of the antenna that includes cable. For example, user equipment 112 may use cable 190A as an antenna (or a portion of the antenna), and the coil may be used to terminate the length of the antenna portion, and the air-core coil may filter out (or attenuates) the transmitted signal and one or more harmonics from reaching device 599. Thus, the length of the antenna of user equipment 112 may be tuned (for example, selected) by the location (or distance 588) of air-core coil 134 relative to user equipment 112. The air-core coil 134 may also serve to filter/attenuate interference (for example, noise) from accessory 599 as well.

Figure 5G:
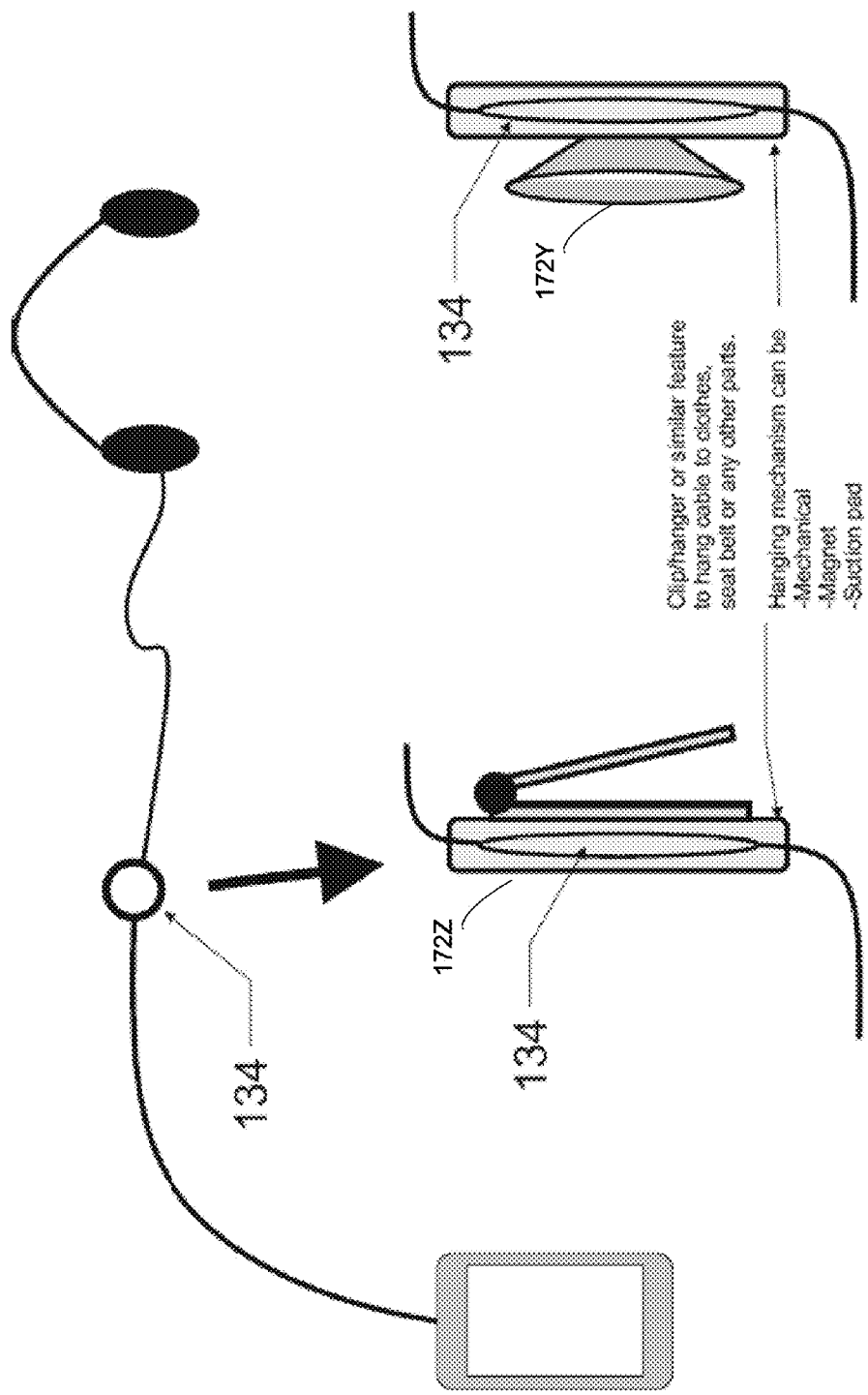

FIG. 5F a system in which two air-core coils are tuned by placing them at certain locations along a cable, in accordance with some example embodiments. FIG. 5G is similar to FIG. 5F but shows two air-core coils 134 placed to provide tuning at two cables 190A-B and 590A-B.

FIG. 5G depicts coil 134 included in a clip 172Z, in accordance with some example embodiments. For example, a user may place the clip 172Z including the coil 134 on an article of clothing, and/or use a hanging mechanism 172Y, such as a magnet, suction pad, and/or the like, to also affix the coil 134 on a surface.

Figure 5H:
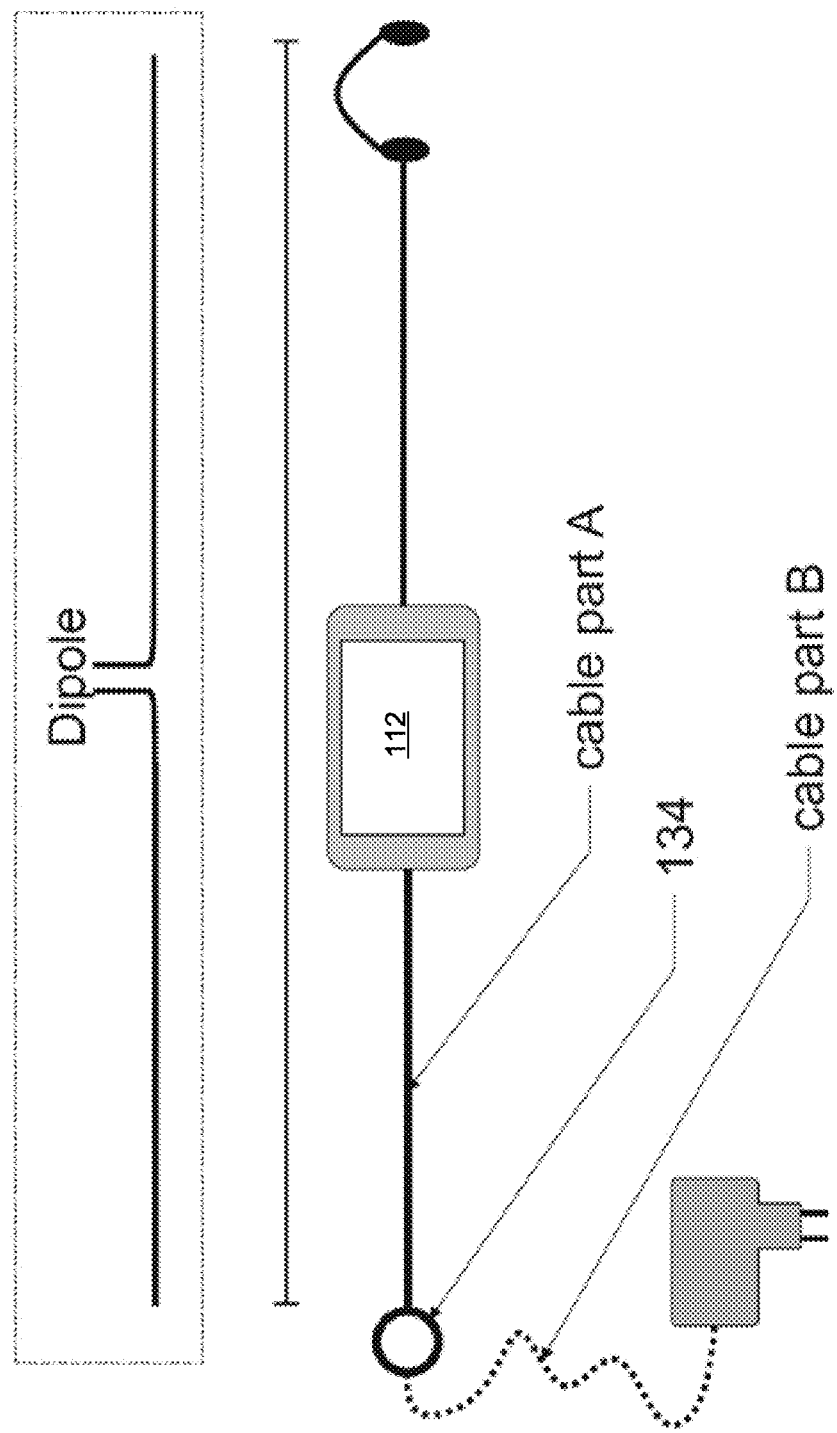

FIG. 5H depicts a model of a dipole which may be formed using the coil 134, in accordance with some example embodiments. For example, the placement of the coil may be varied to form a simple antenna, such as a dipole, which may be used by the device 112.

Figure 5I:
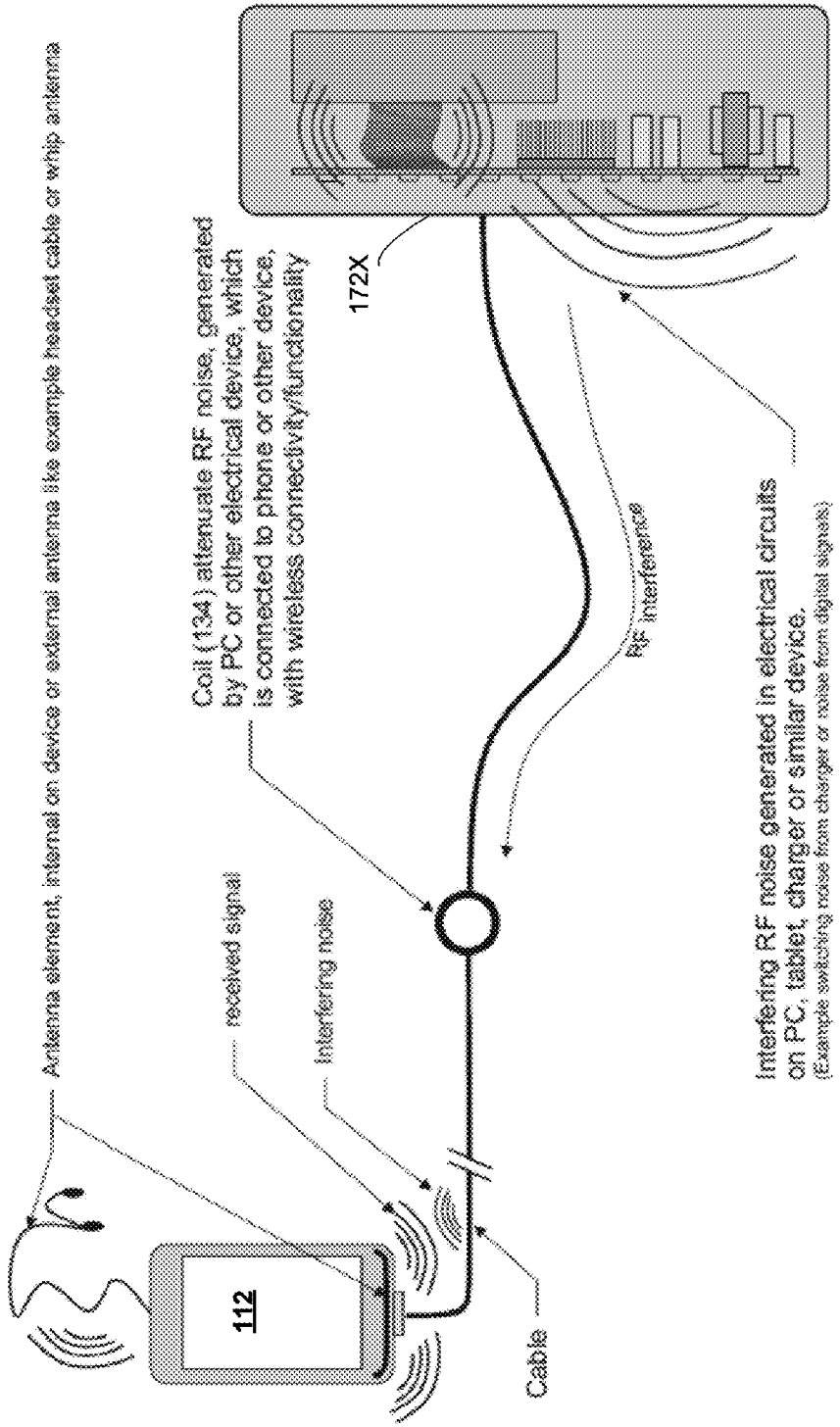

FIG. 5I depicts coil 134 which may be used to attenuate noise and/or interference (including RF noise) generated by device 172X, in accordance with some example embodiments. For example, the generated noise and/or interference from device 172X may be attenuated by coil 134 to prevent the noise and/or interference from propagating into device 112.

Figure 6:
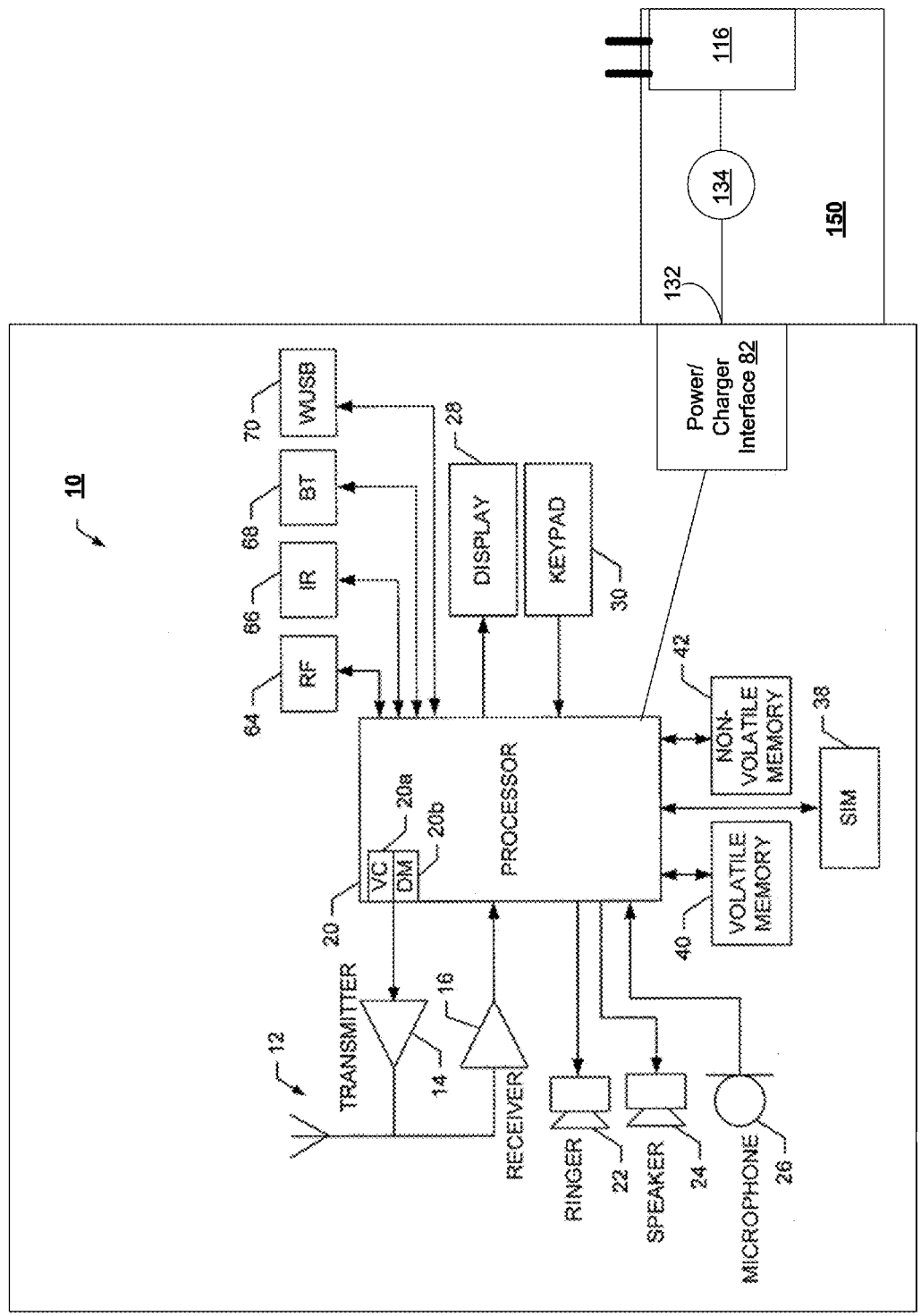
FIG. 6 depicts an example of a user equipment including a charger having the inductor, in accordance with some exemplary embodiments.

FIG. 6 illustrates a block diagram of an apparatus 10, in accordance with some example embodiments. The apparatus 10 (or portions thereof) may be configured to provide user equipment 112. The user equipment may be implemented as any device including a wireless device, smart phone, cell phone, a machine type communication device, a wireless sensor/device, and/or any other processor-based device.

In some example embodiments, apparatus 10 may include a power/charger interface 82 that couples to charger 150.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 112 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 112 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as filtering, at an inductor coil placed in a charger, a transmit signal (and/or higher-order harmonics of the transmit signal as well as other interference) and/or any other operations/functions disclosed herein with respect to an accessory, such as a charger and the like. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the charger and/or user equipment including for example filtering, at an inductor coil placed in a charger, a signal including higher-order harmonics of that signal.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is improved attenuation of unintended emissions.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   a connector mated to enable coupling to a user equipment; and
   an air-core inductive coil coupled to the connector via a wire, wherein the air-core inductive coil includes at least one coil configured to attenuate a wireless radio frequency signal emanating from the user equipment and being carried by the connector via the wire to the air-core inductor, wherein the wireless radio frequency signal represents a radio frequency signal wirelessly transmitted by the user equipment via an antenna, and wherein the air-core inductive coil is further configured to pass at least direct current power signal for charging the user equipment.

2. The apparatus of claim 1, wherein the air-core inductive coil further comprises a structure carrying the at least one coil.

3. The apparatus of claim 2, wherein the structure is detachably coupled to at least one cable, wherein the cable is coupled to the connector and the air-core inductive coil including the at least one coil.

4. The apparatus of claim 2, wherein the structure includes a hollow, center region.

5. The apparatus of claim 1, wherein the coil is placed in a location relative to the user equipment to provide an antenna portion to the user equipment.

6. The apparatus of claim 5, wherein the placed coil provides a tunable antenna including the antenna portion.

7. The apparatus of claim 1, wherein the wireless radio frequency signal emanating from the user equipment includes at least a first signal representative of a signal transmitted by the user equipment and a second signal representative of a higher harmonic of the first signal, and wherein the at least one coil is configured to attenuate the higher harmonic of the first signal.

8. The apparatus of claim 1 further comprising:
   an alternating current to direct current converter coupled to the air-core inductive coil and the connector, wherein the alternating current to direct current converter provides at least the direct current power signal to the connector.

9. The apparatus of claim 8, wherein the air-core inductive coil is located between the connector and the alternating current to direct current converter.

10. The apparatus of claim 8, wherein the alternating current to direct current converter contains the air-core inductive coil.

11. The apparatus of claim 1, wherein the connector contains the air-core inductive coil.

12. The apparatus of claim 1, wherein the connector comprises at least one of a universal serial bus connector or a micro universal serial bus connector.

13. A method comprising:
receiving, at a connector coupled via a wire to an air-core inductive coil, a wireless radio frequency signal received from a user equipment,
wherein the air-core inductive coil includes at least one coil configured to attenuate the wireless radio frequency signal emanating from the user equipment and being carried by the connector via the wire to the air-core inductor, wherein the wireless radio frequency signal represents a radio frequency signal wirelessly transmitted by the user equipment via an antenna, and wherein the air-core inductive coil is further configured to and pass at least direct current power signal for charging the user equipment.

14. The method of claim 13, wherein the air-core inductive coil further comprises a structure carrying the at least one coil.

15. The method of claim 14, wherein the structure is detachably coupled to at least one cable, wherein the cable is coupled to the connector and the air-core inductive coil including the at least one coil.

16. The method of claim 14, wherein the structure includes a hollow, center region.

17. The method of claim 13, wherein the coil is placed in a location relative to the user equipment to provide an antenna portion to the user equipment.

18. The method of claim 17, wherein the placed coil provides a tunable antenna including the antenna portion.

19. The method of claim 13, wherein the wireless radio frequency signal emanating from the user equipment includes at least a first signal representative of a signal transmitted by the user equipment and a second signal representative of a higher harmonic of the first signal, and wherein the at least one coil is configured to attenuate the higher harmonic of the first signal.

20. The method of claim 13 further comprising:
receiving, at an alternating current to direct current converter coupled to the air-core inductive coil and the connector, at least the direct current power signal to the connector.

21. The method of claim 20, wherein the air-core inductive coil is located between the connector and the alternating current to direct current converter.

22. The method of claim 20, wherein the alternating current to direct current converter contains the air-core inductive coil.

23. The method of claim 13, wherein the connector contains the air-core inductive coil.

24. The method of claim 13, wherein the connector comprises at least one of a universal serial bus connector or a micro universal serial bus connector.

25. A non-transitory computer readable storage medium including computer program code which when executed by at least one processor causes operations comprising:
receiving, at a connector coupled via a wire to an air-core inductive coil, a wireless radio frequency signal received from a user equipment,
wherein the air-core inductive coil includes at least one coil configured to attenuate the wireless radio frequency signal emanating from the user equipment and being carried by the connector via the wire to the air-core inductor, wherein the wireless radio frequency signal represents a radio frequency signal wirelessly transmitted by the user equipment via an antenna, and wherein the air-core inductive coil is further configured to and pass at least direct current power signal for charging the user equipment.

\* \* \* \* \*